US011886131B2

(12) United States Patent
Numata et al.

(10) Patent No.: US 11,886,131 B2
(45) Date of Patent: Jan. 30, 2024

(54) IMAGE FORMING APPARATUS

(71) Applicant: CANON KABUSHIKI KAISHA, Tokyo (JP)

(72) Inventors: Yoshiya Numata, Ibaraki (JP); Hisashi Tsukijima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/075,036

(22) Filed: Dec. 5, 2022

(65) Prior Publication Data

US 2023/0176505 A1 Jun. 8, 2023

(30) Foreign Application Priority Data

Dec. 7, 2021 (JP) ................................ 2021-198925

(51) Int. Cl.

| | |
|---|---|
| ***G03G 15/14*** | (2006.01) |
| ***G03G 21/16*** | (2006.01) |
| ***G03G 15/00*** | (2006.01) |
| ***G03G 15/06*** | (2006.01) |
| ***G03G 15/16*** | (2006.01) |

(52) U.S. Cl.

CPC ......... *G03G 15/14* (2013.01); *G03G 15/1615* (2013.01); *G03G 15/5008* (2013.01); *G03G 15/5054* (2013.01); *G03G 15/5058* (2013.01); *G03G 15/5062* (2013.01); *G03G 15/6558* (2013.01); *G03G 21/168* (2013.01); *G03G 2215/00409* (2013.01)

(58) Field of Classification Search

CPC ............... G03G 15/14; G03G 15/1615; G03G 15/5008; G03G 15/5054; G03G 15/5058; G03G 15/5062; G03G 15/6558; G03G 21/168; G03G 2215/00409

See application file for complete search history.

(56) References Cited

U.S. PATENT DOCUMENTS 8,639,136 B2 1/2014 Tomura et al.
2004/0086289 A1* 5/2004 Deguchi ............ G03G 15/1675 399/45
2009/0169274 A1* 7/2009 Suzuki ............... G03G 15/1615 399/302
2014/0270827 A1* 9/2014 Muto ................. G03G 15/5058 399/49

FOREIGN PATENT DOCUMENTS

JP 5864867 B2 2/2016

* cited by examiner

*Primary Examiner* — Joseph S Wong
(74) *Attorney, Agent, or Firm* — Venable LLP

(57) ABSTRACT

An image forming apparatus includes a rotatable image bearing member, a rotatable transfer member, a first driving source to drive the image bearing member, a second driving source to drive the transfer member, and a control portion. Based on a toner amount per unit area of the toner image transferred to each of a plurality of first divided regions on a plane of a recording material in a feeding direction, the control portion controls a driving speed of the transfer member while each of the plurality of the first divided regions passes through a transfer portion. The control portion acquires an index value correlating with a toner amount of the toner image transferred to each of a plurality of second divided regions of each first divided region in a widthwise direction, and controls the driving speed based on the index value while the first divided region passes through the transfer portion.

6 Claims, 11 Drawing Sheets

IMAGE FORMING APPARATUS

FIELD OF THE INVENTION AND RELATED ART

The present invention relates to an image forming apparatus such as a copier, a printer, and a fax machine of an electrophotographic type or an electrostatic recording type and a multifunction printer which is provided with a plurality of these functions.

Conventionally, in the image forming apparatuses such as a copier of the electrophotographic type, for example, a toner image which is formed on an image bearing member is transferred to a recording medium such as paper. In the image forming apparatus of an intermediary transfer method, the toner image which is formed on a photosensitive member as a first image bearing member is secondary transferred to a recording medium such as paper after being primary transferred to an intermediary transfer member as a second image bearing member. Mainly, the image forming apparatus of the intermediary transfer method which includes an intermediary transfer belt as an intermediary transfer member, as an example, will be described below.

Secondary transfer is performed in a secondary transfer portion (a secondary transfer nip portion) which is formed by pressing an outer secondary transfer roller (an outer transfer member, a transfer member) which is provided on an outer peripheral surface side of the intermediary transfer belt against an inner secondary transfer roller (an inner transfer member) which is provided on an inner peripheral surface side of the intermediary transfer belt. Further, there is also a configuration which forms a secondary transfer portion by pressing the outer secondary transfer roller against the intermediary transfer belt via an outer secondary transfer belt (an outer transfer member, a transfer member).

Here, challenges may arise when secondary transfer is performed, depending on characteristics (stiffness, basis weight, surface properties, etc.), etc., of the recording medium which is used for image forming. For example, in a case that the recording medium with different surface properties is used, feeding force which is applied by the intermediary transfer belt to the recording medium may differ and feeding speed of the recording medium may change. When the feeding speed of the recording medium with respect to the intermediary transfer belt differs, length of the image on the recording medium with respect to a feeding direction of the recording medium (a subscanning direction of the image) may change.

The feeding speed of the recording medium is also changed by toner intervened between the intermediary transfer belt and the recording medium in the secondary transfer portion. This is because a coefficient of friction and an electrostatic state between the intermediary transfer belt and the recording medium change by intervening of toner and the feeding force varies. In particular, in a case that the toner image is unevenly distributed in a sheet of recording medium or a case that a toner application amount changes, the feeding speed of the recording medium may vary even while the recording medium passes through the secondary transfer portion. As a result, expansion and contraction rate of the image in a feeding direction of the recording medium (in a subscanning direction of the image) may vary (partial magnification variation) while the recording medium passes through the secondary transfer portion, and local image length in the subscanning direction may change.

In order to address these challenges, setting speed of the outer secondary transfer belt so that magnification of the image on the recording medium is same when no toner image is applied and when a halftone toner image is applied, is proposed in Japanese Patent 5864867. In this way, Japanese Patent 5864867 aims to prevent image misalignment which is caused by presence or absence of a toner image.

As described above, in a configuration which is described in Japanese Patent 5864867, under different conditions of toner application amount (no toner, halftone), the speed of the outer secondary transfer belt is adjusted so that the lengths of the images on the recording medium are matched and the image misalignment is prevented. In this case, in order to determine a single speed of the outer secondary transfer belt at which an image expansion and contraction amount is constant for a given toner application amount, it is necessary that the toner application amount and the image expansion and contraction amount are in a proportional relationship.

However, in the secondary transfer portion, electrostatic attracting force between the intermediary transfer belt and the recording medium and the frictional force via the toner act in combination. Therefore, it is known that there is a case that the speed of the transfer member may not be uniquely determined since the relationship between the toner application amount and the image expansion and contraction amount is not always proportional.

SUMMARY OF THE INVENTION

Therefore, an object of the present invention is to provide the image forming apparatus in which variation in magnification of the image on the recording media is effectively suppressed.

The object which is described above is achieved by the image forming apparatus according to the present invention. In summary, the present invention is an image forming apparatus comprising a rotatable image bearing member configured to bear a toner image, a rotatable transfer member configured to form a transfer portion by contacting the image bearing member and to transfer the toner image to a recording material passing through the transfer portion from the image bearing member, a first driving source configured to drive the image bearing member, a second driving source configured to drive the transfer member and a control portion configured to control the second driving source, wherein, based on a toner amount per unit area of the toner image transferred to each of a plurality of first divided regions into which a plane of the recording material is divided with respect to a feeding direction of the recording material, the control portion controls a driving speed of the transfer member while each of the plurality of the first divided regions passes through the transfer portion, and wherein the control portion acquires an index value correlating with a toner amount of the toner image transferred to each of a plurality of second divided regions into which each of the first divided regions is divided with respect to a widthwise direction crossing the feeding direction of the recording material, the control portion controls the driving speed of the transfer member based on the index value while the corresponding first divided regions passes through the transfer portion.

Further features of the present invention will become apparent from the following description of exemplary embodiments with reference to the attached drawings.

DESCRIPTION OF THE EMBODIMENTS

The image forming apparatus according to the present invention will be more specifically described below, in accordance with the figures.

First Embodiment

1. Configuration and Operation of Image Forming Apparatus

Figure 1:
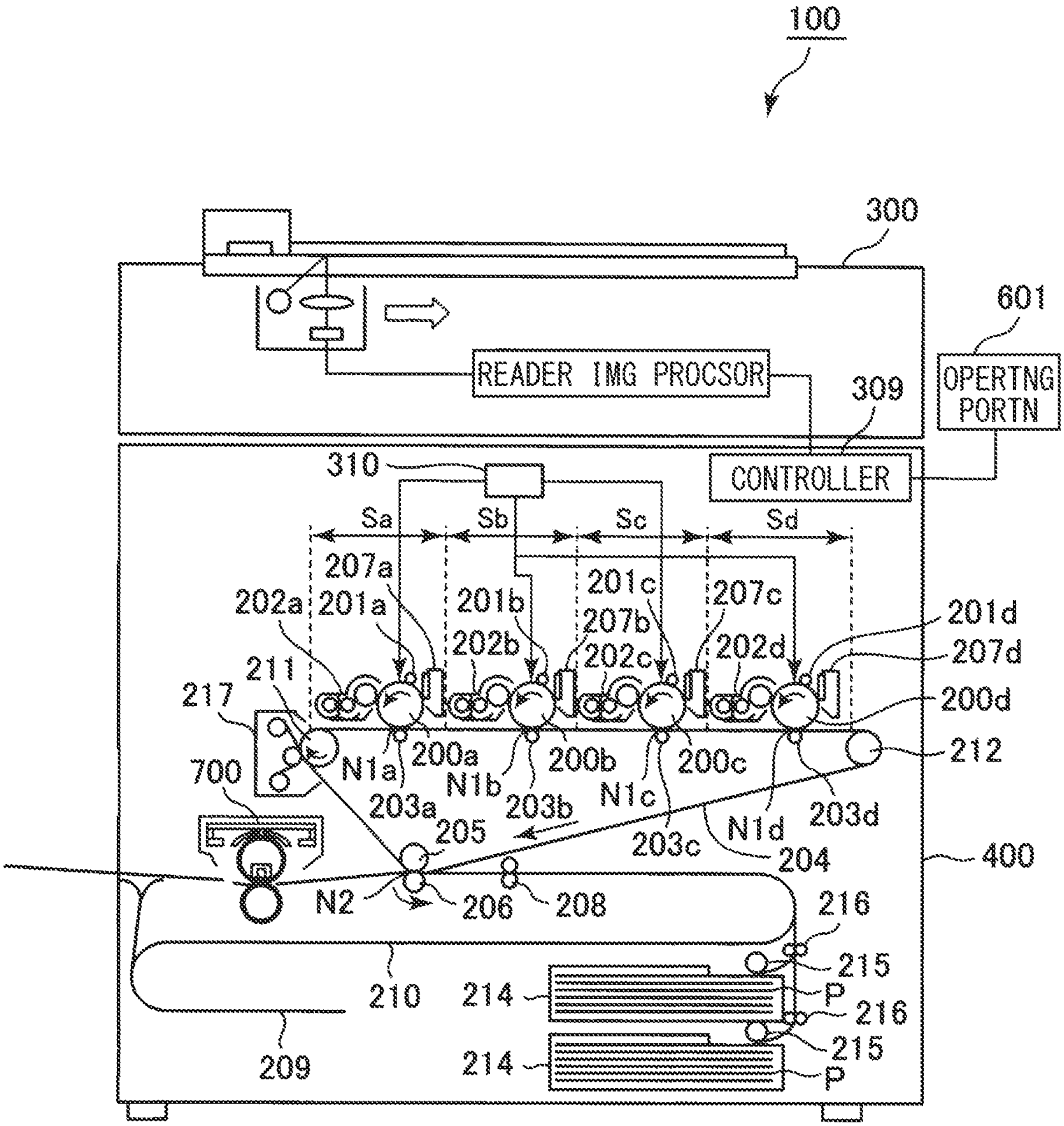
FIG. 1 is a schematic sectional view of an image forming apparatus.

FIG. 1 is a schematic sectional view of the image forming apparatus 100 according to the embodiment. In the embodiment, the image forming apparatus 100 is a multifunction printer of a tandem type (which includes functions of a copier, a printer and a fax machine) which adopts an intermediary transfer method which is capable of forming full color images by using an electrophotographic method.

The image forming apparatus 100 includes four image forming portions Sa, Sb, Sc and Sd which form color toner images of yellow (Y), magenta (M), cyan (C) and black (K) respectively, as a plurality of image forming portions (stations). An element which includes same or corresponding function or configuration in each image forming portion Sa, Sb, Sc and Sd may be comprehensively described by omitting a, b, c and d at ends of reference numerals which indicate the element for one of the colors. In the embodiment, an image forming portion S is configured of a photosensitive drum 200, a charging roller 201, an exposure device 310 which exposes each photosensitive drum 200, a developing device 202, a primary transfer roller 203, etc., which will be described below.

The photosensitive drum 200, which is a rotatable drum type (cylindrical) photosensitive member (an electrophotographic photosensitive member) as a first image bearing member, is rotationally driven in a counterclockwise direction in FIG. 1. A surface of the photosensitive drum 200 which is rotating is uniformly charged to predetermined electrical potential of predetermined polarity (negative polarity in the embodiment) by the charging roller 201, which is a roller type charging member as a charging means. A laser beam from the exposure device 310 (a polygon laser scanner) as an exposure means is emitted, the surface of the photosensitive drum 200 which is charged is scanning exposed and an electrostatic latent image (an electrostatic image) is formed on the photosensitive drum 200. The exposure device 310 emits the laser beam on the surface of the photosensitive drum 200 by scanning the laser beam according to an image signal which a control portion 309 receives from an external device 62 (a host device) (FIG. 5) such as a personal computer, etc. In the embodiment, the exposure device 310 is configured as a single unit which exposes the photosensitive drums from 200*a* through 200*d* of image forming portions from Sa through Sd, respectively.

The electrostatic latent image which is formed on the photosensitive drum 200 is developed (visualized) when toner as developer is supplied by the developing device 202 as a developing means, and a toner image (a toner photographic image, a developer image) is formed on the photosensitive drum 200. In the embodiment, the toner which is charged with the same polarity (a negative polarity in the embodiment) as that of the photosensitive drum 200 is adhered (an inverted developing method) on an exposed portion (an image portion) on the photosensitive drum 200, in which an absolute value of electrical potential is decreased by being exposed after being uniformly charged. In the embodiment, normal charging polarity of the toner, which is a primary charging polarity of the toner during a developing process, is negative.

The intermediary transfer belt 204 which is an intermediary transfer member which is configured of an endless belt as a second image bearing member is arranged so as to oppose the photosensitive drums from 200*a* through 200*d* of the image forming portions from Sa through Sd, respectively. The intermediary transfer belt 204 is stretched over a driving roller 211, a tension roller 212 and an inner secondary transfer roller 205 as a plurality of stretching rollers (supporting rollers) and is stretched at a predetermined tension. The intermediary transfer belt 204 rotates (moves circulatingly) in a clockwise direction in FIG. 1, when the driving roller 211 is rotationally driven by a belt driving motor M1 (FIG. 5) as a driving source which is configured of a first driving portion and a driving force is transmitted. On an inner peripheral surface side of the intermediary transfer belt 204, the primary transfer rollers from 203*a* through 203*d*, which are roller type transfer members as primary transfer means, are arranged corresponding to the photosensitive drums from 200*a* through 200*d*, respectively. The primary transfer roller 203 contacts an inner peripheral surface of the intermediary transfer belt 204, presses the intermediary transfer belt 204 toward the photosensitive drum 200, and forms a primary transfer portion (a primary transfer nip portion) N1 which contacts the photosensitive drum 200 and the intermediary transfer belt 204. Stretching rollers and each of the primary transfer rollers 203 except the driving roller 211, are rotated in accordance with rotation of the intermediary transfer belt 204.

The toner image which is formed on the photosensitive drum 200 is primary transferred onto the rotating intermediary transfer belt 204 by an action of the primary transfer roller 203 at a primary transfer portion N1. During a primary transfer process, a primary transfer voltage (primary transfer bias) of opposite polarity (positive polarity in the embodiment) to the normal charging polarity of the toner is applied to the primary transfer roller 203. For example, during forming a full color image, toner images of colors of yellow, magenta, cyan and black, which are formed on the photosensitive drums from 200*a* through 200*d*, respectively, are transferred onto the intermediary transfer belt 204 in such a way of being superimposed in sequence.

On an outer peripheral surface side of the intermediary transfer belt 204, at a position which opposes an inner secondary transfer roller (an inner transfer member) 205, an outer secondary transfer roller (an outer transfer member) 206 which is a roller type transfer member as a secondary transfer means. The outer secondary transfer roller 206 presses toward the inner secondary transfer roller 205, abuts with the inner secondary transfer roller 205 via the intermediary transfer belt 204 and forms the secondary transfer portion (the secondary transfer nip portion) N2 which contacts the intermediary transfer belt 204 and the outer secondary transfer roller 206. The outer secondary transfer roller 206 abuts with the intermediary transfer belt 204 and rotates in a counterclockwise direction in FIG. 1. The outer secondary transfer roller 206 is rotatably driven by an outer secondary transfer roller driving motor M2 (FIG. 5) which is a driving source which is configured of a second driving portion. The toner image on the intermediary transfer belt 204 is secondary transferred onto a recording medium P such as paper which is nipped and fed between the intermediary transfer belt 204 and the outer secondary transfer roller 206 by an action such as the outer secondary transfer roller 206 at the secondary transfer portion N2. During a secondary transfer process, a secondary transfer voltage (a secondary transfer bias) of opposite polarity to the normal charging polarity of the toner is applied to the outer secondary transfer roller 206. In the embodiment, the inner secondary transfer roller 205 is electrically grounded. Incidentally, an outer transfer member corresponding to the outer secondary transfer roller 206 in the embodiment may be electrically grounded, and a transfer voltage of same polarity as the normal charging polarity of the toner may be applied to the transfer inner member corresponding to the inner secondary transfer roller 205 in the embodiment during the secondary transfer process.

The recording medium (recording material, sheet, paper) P is accommodated in a cassette 214 as an accommodating portion. The recording medium P in the cassette 214 is fed one by one by a feeding roller 215 as a feeding member, etc., and fed to a registration roller portion (a registration roller pair) 208 by a feeding roller 216 as a feeding member, etc. After the recording medium P is made to wait in the registration portion 208, the recording medium P is fed to the secondary transfer portion N2 from the registration portion 208, when timing is controlled by a control portion (CPU) 309 in order to align a position of the toner image on the intermediary transfer belt 204 with a position of the recording medium P.

The recording medium P to which the toner image is transferred is fed to a fixing device 700 as an image heating device. The fixing device 700 fixes (melts and adheres) the toner image on the recording medium P by heating and pressing the recording medium P which bears an unfixed toner image.

In a case of printing on one side of the recording medium P, the recording medium P on which the toner image is fixed as described above is discharged (output) to an outside of a main assembly of the image forming apparatus (hereinafter simply referred to as "a main assembly"). Further, in a case of printing on both sides of the recording medium P, after the toner image is fixed on a first side, the recording medium P is fed to a reversing portion 209 which is provided inside the main assembly 400, and a feeding direction of the recording medium P is reversed and the recording medium P is fed to a reversing passage after the recording medium P is stopped. After that, the recording medium P is fed to the secondary transfer portion N2 through a double sided feeding portion 210 in a state that a front side and a back side are reversed, and discharged to outside of the apparatus through the fixing device 700 after the toner image is secondary transferred to a second side.

On the other hand, the toner which remains on a surface of the photosensitive drum 200 after the primary transfer process (primary transfer residual toner) is removed from the surface of photosensitive drum 200 by a drum cleaner 207 as a photosensitive member cleaning means, and collected. In this way, the surface of the photosensitive drum 200 is cleaned. Further, adhered material, which remains on a surface of the intermediary transfer belt 204 after the secondary transfer process (secondary transfer residual toner) such as the toner and paper dust, is removed from the surface of the intermediary transfer belt 204 by a belt cleaner 217 as an intermediary transfer member cleaning means and collected. In this way, the surface of the intermediary transfer belt 204 is cleaned.

Figure 5:
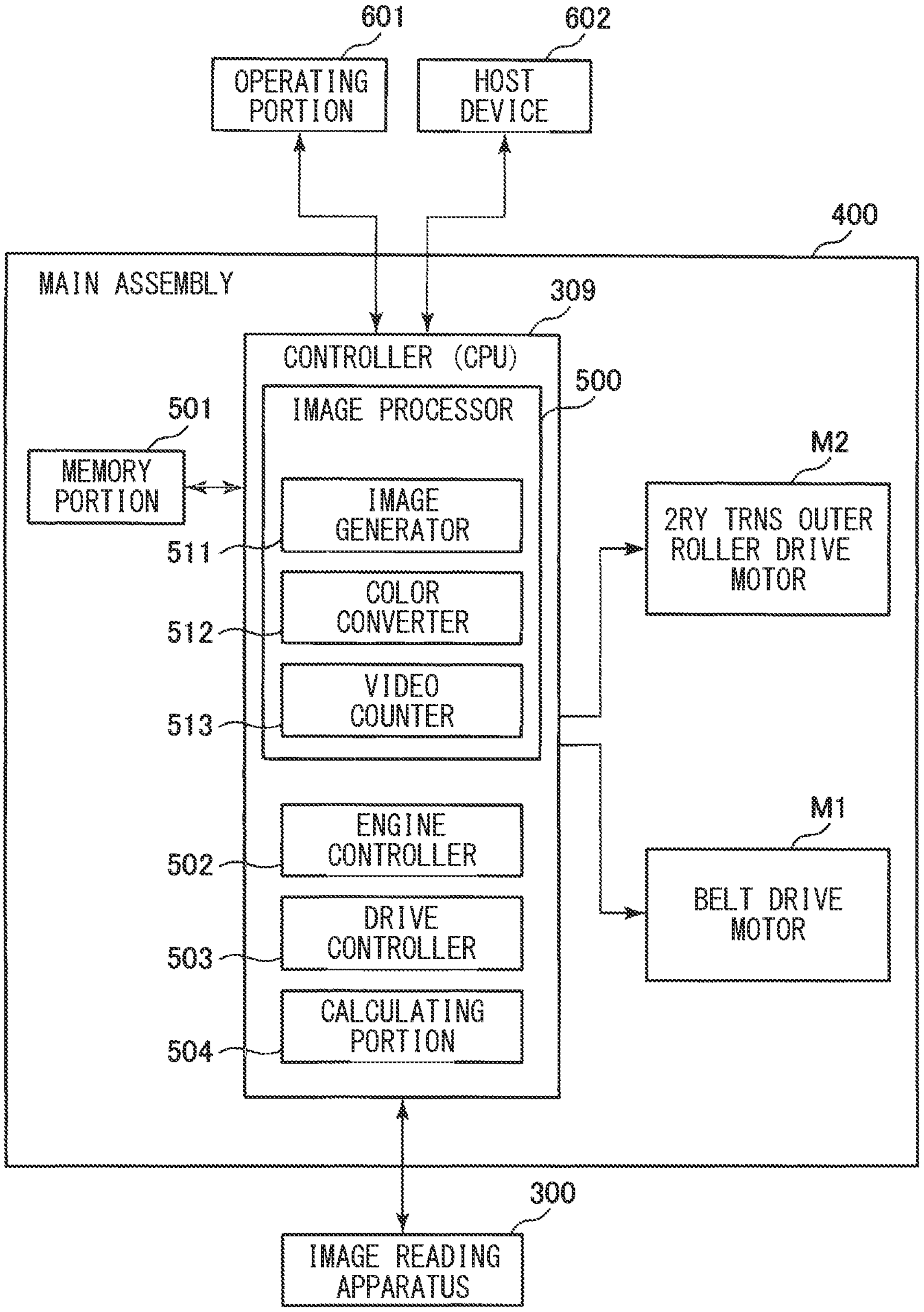
FIG. 5 is a block diagram for illustrating a control mode of the image forming apparatus.

FIG. 5 is a block diagram showing a control mode of the image forming apparatus 100 in the embodiment. The image forming apparatus 100 includes a control portion (CPU) 309 inside the main assembly 400. The control portion 309 is configured to include each of functional blocks such as an image processing portion 500, an engine control portion 502, a driving control portion 503, and a calculating portion 504. Further, the image processing portion 500 is configured to include each of functional blocks such as an image creating portion 511, a color conversion process portion 512 and a video counting portion 513. In the embodiment, each of the functional blocks described above is realized when the control portion 309 executes a program which is stored in a storing portion 501, which is configured to include ROM and RAM which are provided inside the main assembly 400. The control portion 309 is connected to each portion of the image forming apparatus 100 which includes a belt driving motor M1 and an outer secondary transfer roller driving motor M2. The control portion 309 comprehensively controls an operation of each portion of the image forming apparatus 100. Further, the control portion 309 is connected to an operating portion 601 and an image reading apparatus 300, which are provided with the image forming apparatus 100, and a host device 602, which is outside of the image forming apparatus 100. An engine control portion 502 of the control portion 309 controls an image forming process as described above. Further, the driving control portion 503 of the control portion 309 performs controlling driving revolutions of the outer secondary transfer portion roller 206 (number of revolutions per unit time), etc., as will be described below. Further, the calculating portion 504 of the control portion 309 performs controlling to determine an instruction value of the number of the driving revolutions of the outer secondary transfer portion roller 206 based on toner image distribution, etc., as will be described below. The image processing portion 500 will be described below.

2. Image Magnification Variation in the Secondary Transfer Portion

When the toner image is transferred from the intermediary transfer belt 204 to the recording medium P at the secondary transfer portion N2, speed difference may occur between surface speed of the intermediary transfer belt 204 and feeding speed of the recording medium P. At this time, when the feeding speed of the recording medium P is faster than the surface speed of the intermediary transfer belt 204, the toner image on the recording medium P stretches and magnification of the image on the recording medium P (here it is also referred to simply as "image magnification") becomes higher. On the contrary, when the feeding speed of the recording medium P is slower than the surface speed of the intermediary transfer belt 204, the toner image on the recording medium P shrinks and the magnification of the image on the recording medium P becomes lower. Therefore, when the image magnification is varied, expansion and contraction or misalignment of the image on the recording medium P may occur.

3. Effect of Toner Application Amount on Intermediary Transfer Belt

The intermediary transfer belt 204 applies the feeding force to the recording medium P by combinational action of electrostatic attraction force and frictional force due to the secondary transfer bias and intermolecular force of the toner. Furthermore, when the toner is intervened between the intermediary transfer belt 204 and the recording medium P, these forces vary with the toner application amount. Therefore, depending on distribution of the toner image which is transferred onto one sheet of the recording medium P, the feeding force which is applied to the recording medium P from the intermediary transfer belt 204 varies while the recording medium P is passing through the secondary transfer portion N2. As a result, the feeding speed of the recording medium P varies continuously, and the magnification of the image which is transferred to the recording medium P also varies within a single sheet of the recording medium P (partial magnification variation).

4. Effect of Outer Secondary Transfer Roller

In a case that the outer secondary transfer roller 206 has a configuration in which the outer secondary transfer roller 206 is rotationally driven without being driven from the outside, the outer secondary transfer roller 206 is rotationally driven by the intermediary transfer belt 204 via the recording medium P. Therefore, the greater a rotational load of the outer secondary transfer roller 206, the more feeding resistance of the recording medium P increases, and the feeding speed of the recording medium P decreases.

In contrast, in a case that the outer secondary transfer roller 206 has a configuration in which the outer secondary transfer roller 206 is driven by an external driving motor, etc., the recording medium P receives the feeding force from a transfer surface side by the intermediary transfer belt 204 and also receives the feeding force from the outer secondary transfer roller 206 from a non-transfer surface side. At this time, when the number of the revolutions of the outer secondary transfer roller 206 is increased so that surface speed (peripheral speed) of the outer secondary transfer roller 206 is higher than in the case that the outer secondary transfer roller 206 is rotationally driven, the recording medium P receives the feeding force from the outer secondary transfer roller 206 in the feeding direction and the feeding speed of the recording medium P increases. On the contrary, when the number of the revolutions of the outer secondary transfer roller 206 is decreased so that the surface speed of the outer secondary transfer roller 206 is lower than in the case that the outer secondary transfer roller 206 is rotationally driven, the outer secondary transfer roller 206 applies the feeding force to the recording medium P in an opposite direction of the feeding direction. In this case, since the outer secondary transfer roller 206 acts as the feeding resistance, the feeding speed of the recording medium P decreases.

Thus, by changing the number of the revolutions of the outer secondary transfer roller 206, it is possible to change the feeding speed of the recording medium P, and as a result, it is possible to change the image magnification on the recording medium P.

5. Correction of Image Magnification by Outer Secondary Transfer Roller

Figure 2:
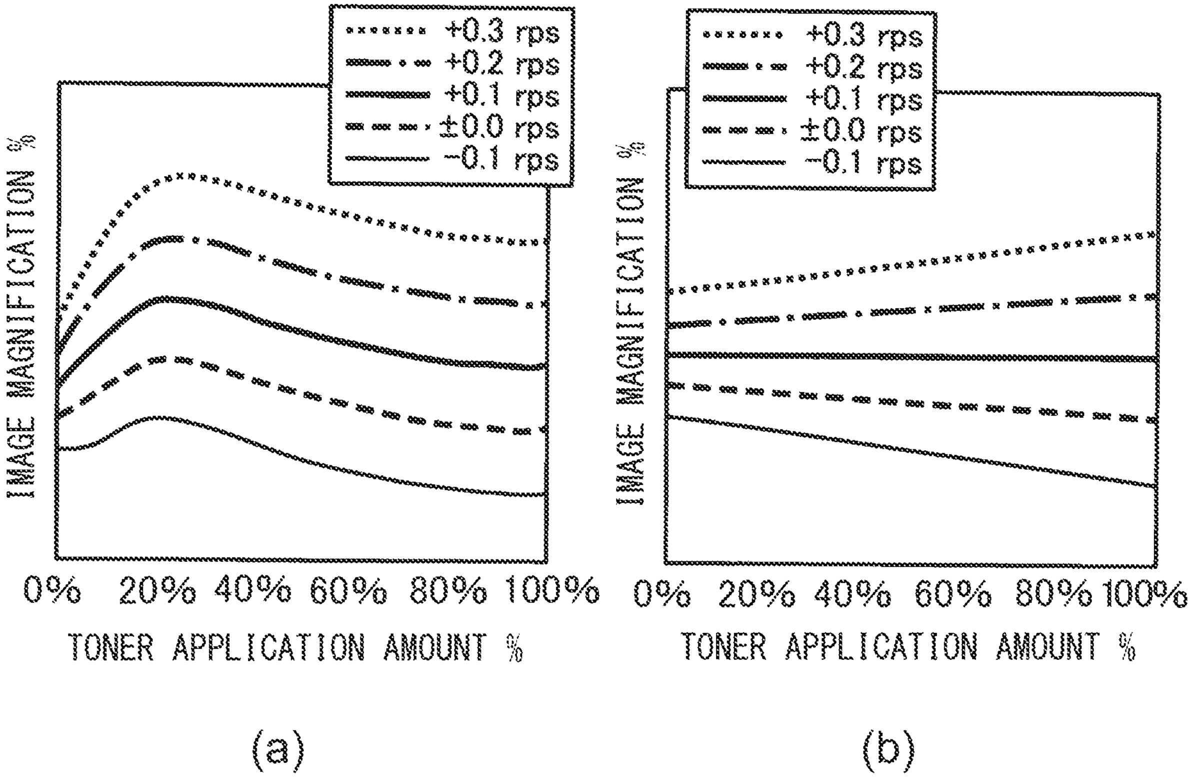
FIG. 2, part (a) and part (b), is a graph diagram showing a relationship between a toner application amount and magnification of an image.
Figure 3:
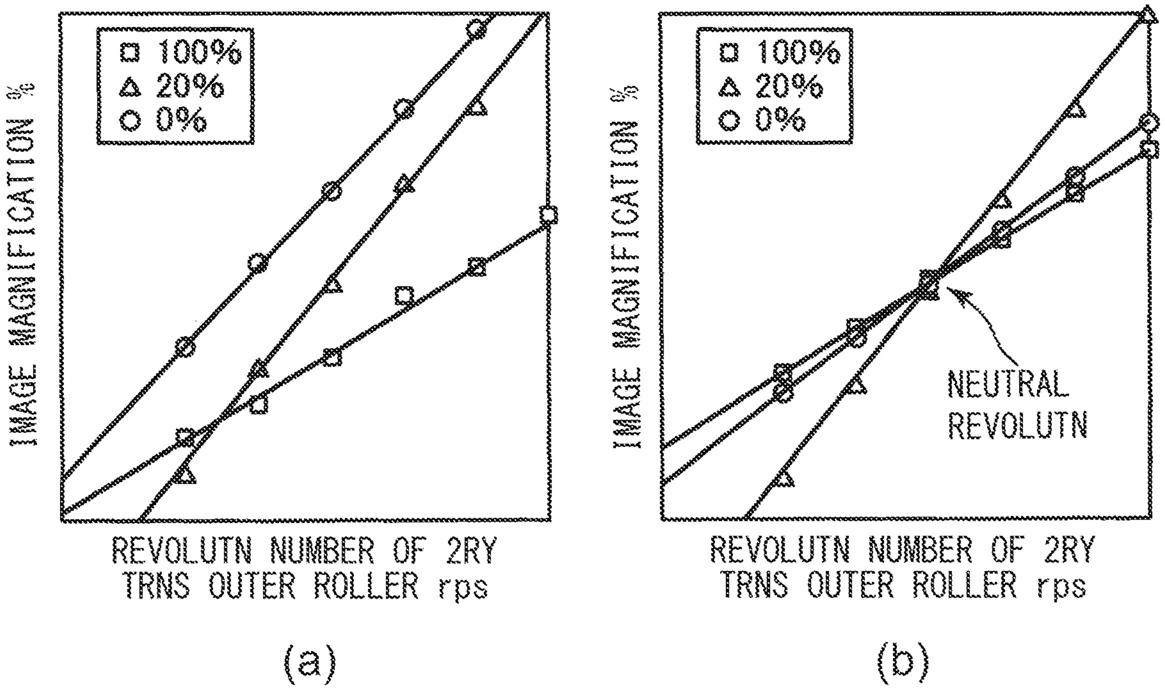
FIG. 3, part (a) and part (b), is a graph diagram showing a relationship between driving revolutions of an outer secondary transfer roller and the magnification of the image.

As described above, the image magnification on the recording medium P varies depending on the toner application amount and the number of the driving revolutions of the outer secondary transfer roller 206. Relationship between the toner application amount and the image magnification by the number of the driving revolutions of the outer secondary transfer roller 206 is shown in FIG. 2, part (a) and part (b). In FIG. 2, part (a) and part (b), a horizontal axis indicates the toner application amount and a vertical axis indicates the image magnification (the further upward in the figure, the higher the image magnification). Further, relationship between the number of the driving revolutions of the outer secondary transfer roller 206 and the image magnification by the toner application amount is shown in FIG. 3, part (a) and part (b). In FIG. 3, part (a) and part (b), the horizontal axis indicates the number of the driving revolutions of the outer secondary transfer roller 206 (the further to the right, the greater the number) and the vertical axis indicates the image magnification (the further upward in the figure, the higher the image magnification). Here, in FIG. 2 (*a*), the relationship between the toner application amount and the image magnification is a curvilinear relationship in which the image magnification is the largest at a certain toner application amount and is inflected as the toner application amount varies. In contrast, in FIG. 2 (*b*), the relationship between the toner application amount and the image magnification in a case that the image magnification is proportional to the toner application amount is shown as a "comparative example".

As described above, the higher the number of the driving revolutions of the outer secondary transfer roller 206, the higher the feeding speed of the feeding member P and the greater the image magnification. Therefore, both a curved line in FIG. 2 (*a*) and a straight line in FIG. 2 (*b*) move upward in the figure as the number of the driving revolutions of the outer secondary transfer roller 206 increases. Further, the greater the toner application amount, the more easily the image magnification varies with respect to variation of the number of the driving revolutions of the outer secondary transfer roller 206, so a space between the curved line and the straight line tends to be wider.

In FIG. 3, part (a) and part (b), relationships of the image magnification with respect to the number of the driving revolutions of the outer secondary transfer roller 206 for three levels of the toner application amount 0%, 20% and 100% are shown. As shown in FIG. 3, the image magnification varies substantially linearly (proportionally) with respect to the number of the driving revolutions of the outer secondary transfer roller 206.

In a case that the image magnification is proportional to the toner application amount, as in the comparative example which is shown in FIG. 2 (*b*), there is the number of the driving revolutions of the outer secondary transfer roller 206 (here, it is also referred to as "neutral revolutions") in which the image magnification is constant (a straight horizontal line) with respect to the toner application amount in FIG. 2 (*b*). And in FIG. 3 (*b*), which indicates relationship between the number of the driving revolutions of the outer secondary transfer roller 206 and the image magnification in the comparative example, the straight lines by toner application amount intersect at one point when the number of the driving revolutions of the outer secondary transfer roller 206 is the neutral revolutions. Therefore, in a case of the comparative example in which the image magnification is proportional to the toner application amount, it is possible to calculate the neutral revolutions as follows. That is, it is possible to calculate the neutral revolutions by measuring the image magnifications for four combination conditions which are minimum two conditions for the number of the driving revolutions of the outer secondary transfer roller 206, and minimum two conditions for the toner application amount.

Figure 4:
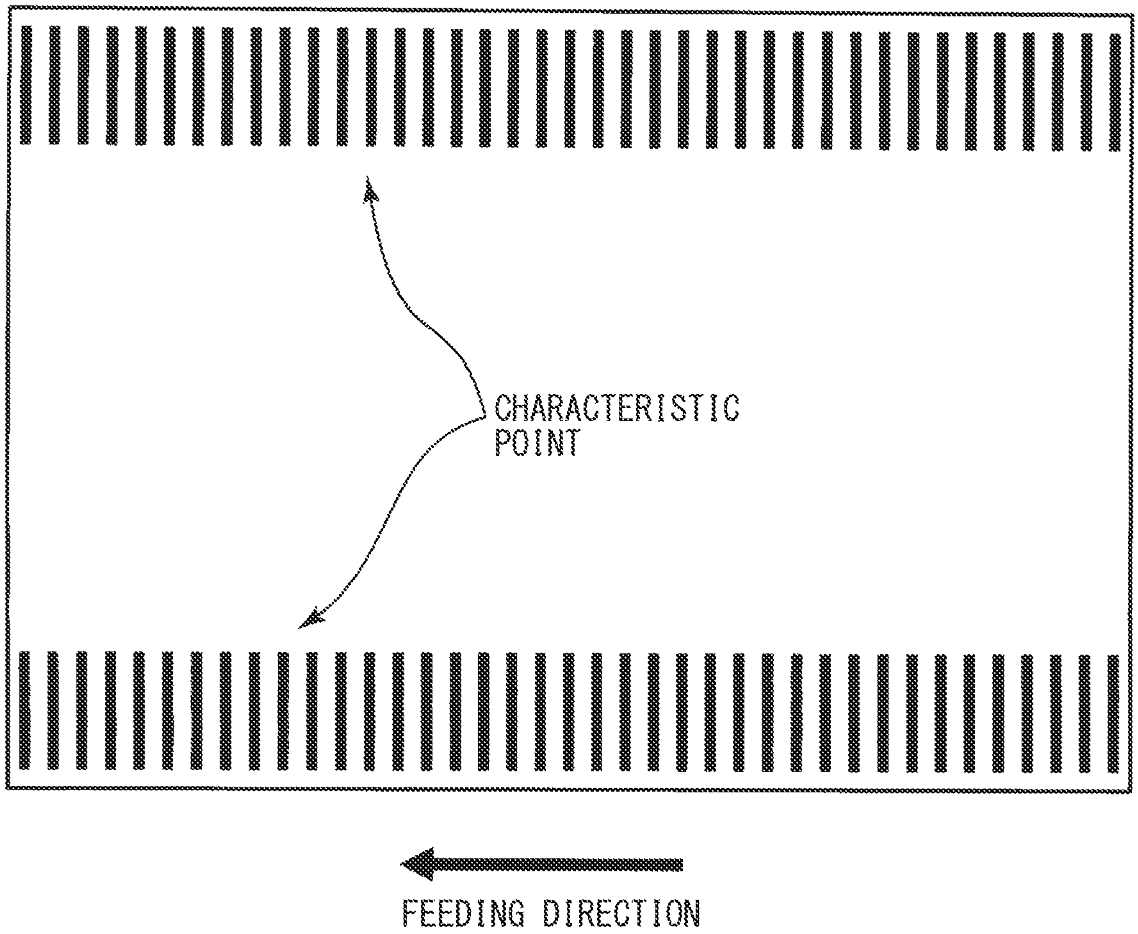
FIG. 4 is a schematic diagram showing an example of an image pattern for measuring the magnification of the image.

Incidentally, it is possible to calculate by outputting an image with feature points in the feeding direction (the subscanning direction) as shown in FIG. 4, for example, and reading a distance between the feature points. Otherwise, the feeding speed of the recording medium P may be measured by a speed sensor, etc., and it may be converted to the image magnification.

On the other hand, in a case that the relationship of the image magnification with respect to the toner application amount is not proportional as shown in FIG. 2 (*a*), there is no neutral revolutions of the outer secondary transfer roller 206 in which the image magnification with respect to the toner application amount is constant. Therefore, as shown in FIG. 3 (*a*), the straight lines by the toner application amount intersect at different points. As a result, an appropriate number of driving revolutions of the outer secondary transfer roller 206 for a predetermined image magnification is not possible to be determined by a method of measuring the image magnification under several conditions which combine the number of the driving revolutions of the outer secondary transfer roller 206 with the toner application amount.

Therefore, even in a case that the relationship of the image magnification with respect to the toner application amount is not proportional, in order to set a predetermined image magnification with respect to an image with an arbitrary toner application amount, it is desirable to drive the outer secondary transfer roller 206 at different driving revolutions depending on the toner application amount.

6. Configuration of Processing Portion which is Related to Image Forming

Next, by using FIG. 5, a configuration and an operation of a processing portion which is related to image forming in the image forming apparatus 100 in the embodiment will be described.

<Image Creating Portion>

The image creating portion 511 creates a raster image which is possible to be processed for printing based on print data (including image data) which is received from a host device 602 which is arranged outside the main assembly 400, etc., and outputs it for each pixel as RGB data and attribute data which indicates data attribute.

Here, the image data which the image forming portion 511 receives may be image data which is read by the image reading apparatus 300 which is provided with the image forming apparatus 100. The image reading apparatus 300 is an apparatus which reads a document which is placed on a document table glass and has a function to convert the document into the raster image which is possible to be processed for printing (a reader image processing portion). In addition, the image data which the image creating portion 511 receives may be image data which is received from an image reading means which is arranged outside of the main assembly 400 via an interface (not shown) which is provided in the image forming apparatus 100.

<Color Conversion Processing Portion>

The RGB data which is created by the image creating portion 511 is sent to a color conversion processing portion 512. The color conversion processing portion 512 performs color conversion of the RGB data according to the toner color and creates CMYK data. The CMYK data have a value for each pixel corresponding to the toner application amount of each CMYK color, and is expressed in each color as 8 bits from 0 through 255, for example. And the toner application amount for each pixel is the sum of the toner application amounts of each of CMYK colors.

<Video Counting Portion>

The CMYK data on which color conversion is performed by the color conversion processing portion 512 is sent to the video counting portion 513. The video counting portion 513 detects the toner application amount of the pixels in each divided region when the CMYK data (a region within a printing page, in the image data) which is created by the color conversion processing portion 512 is divided by each predetermined region (hereinafter referred to as "divided region").

Figure 6:
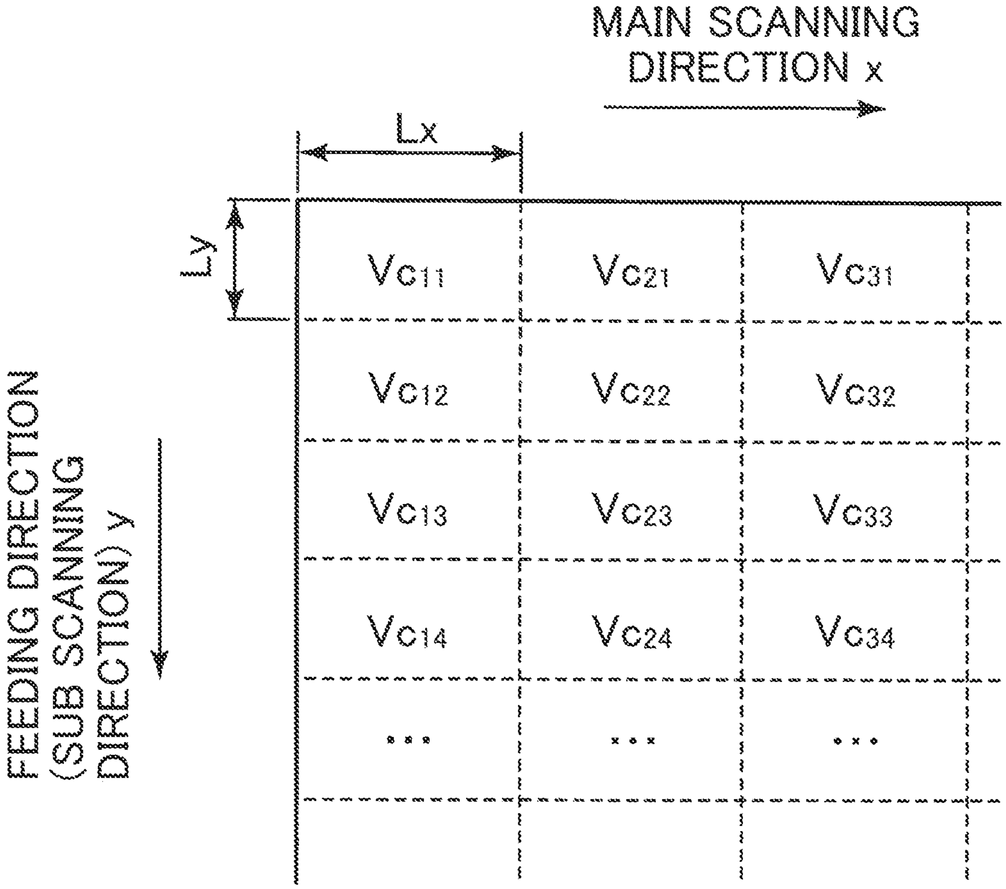
FIG. 6 is a schematic diagram for illustrating a method of dividing a CMYK image which calculates a divided video count value.

FIG. 6 shows an example when the image data which is described above is divided by width of Ly in the feeding direction (in the subscanning direction) and width of Lx in the main scanning direction. In FIG. 6, a division number in the main scanning direction (x direction in the figure) is i (i=from 1 through m) and a division number in the feeding direction (y direction in the figure) is j (j=from 1 through n).

A divided video count value $Vc_{ij}$ in each divided region is calculated based on the toner application amount of the pixels in each divided region. Here, the divided video count value $Vc_{ij}$ is a representative value which is detected by the video counting portion 513. The representative value is determined, for example, as a simple sum of the toner application amount per pixel in each divided region, the sum of the maximum values per unit area in each divided region, and an area ratio (coverage ratio, area ratio) in which toner is applied in each divided region.

In the following, a case that average toner application amount (from 0 through 1023) in each divided region is used as the divided video count value $Vi_{ij}$ will be described. Incidentally, the toner application amount (%) in FIG. 2, FIG. 3, FIG. 7, etc., represents ratio of the total toner application amount of each color in a case that the toner application amount of each pixel is maximum.

7. Configuration of Calculating Portion for Drive Revolutions of Outer Secondary Transfer Roller Subsequently, a configuration and an operation of the calculating portion for the number of the driving revolutions of the secondary transfer outer roller 206 of the image forming apparatus 100 in the embodiment will be described by using FIG. 5.

<Calculating Portion>

The calculating portion 504 suppresses an image magnification variation which is caused by toner image distribution in one sheet of the recording medium P and determines a command value (a driving command value) for the number of the driving revolutions of the outer secondary transfer roller 206 to achieve the desired image magnification.

Figure 7:
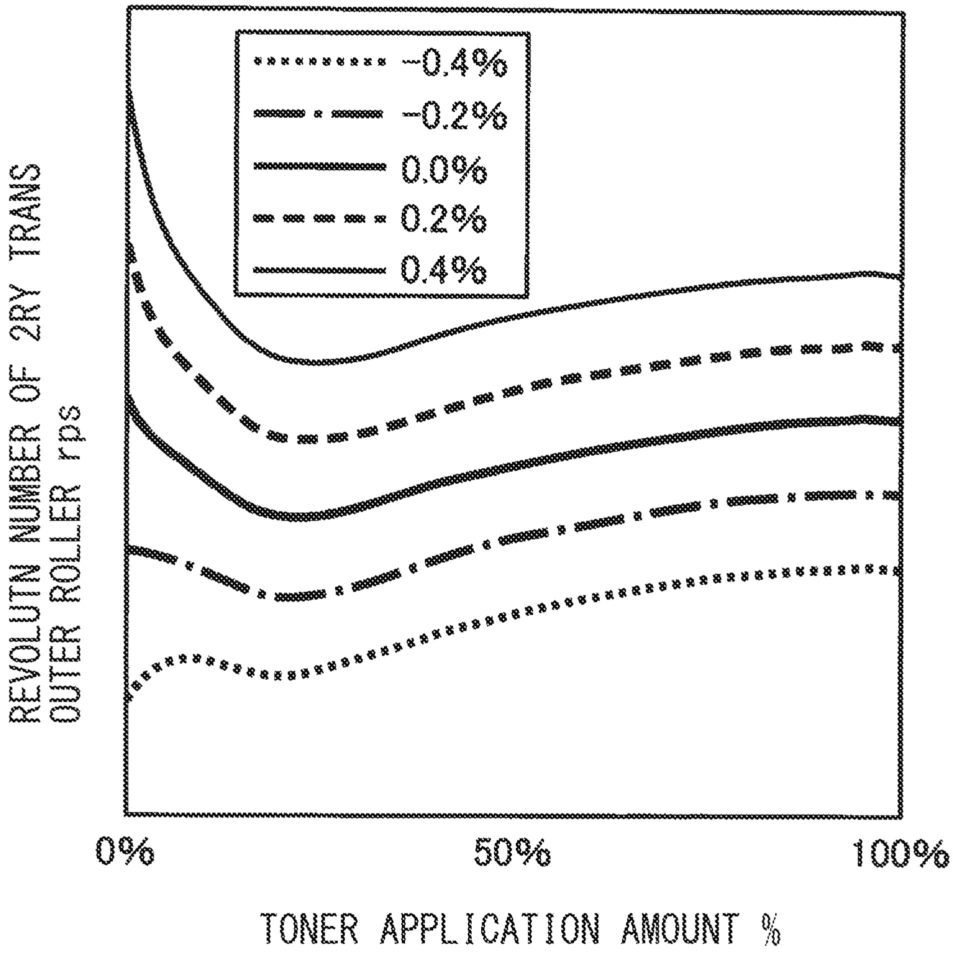
FIG. 7 is a graph diagram showing a relationship between a toner application amount and driving revolutions of an outer secondary transfer roller to achieve a predetermined magnification of the image.

FIG. 7 shows relationship of the number of the driving revolutions of the outer secondary transfer roller 206 with respect to the toner application amount to achieve a predetermined image magnification, in relationship of the image magnification with respect to the toner application amount and the number of the driving revolutions of the outer secondary transfer roller 206 which are shown in FIG. 2 (*a*) and FIG. 3 (*a*). In FIG. 7, a horizontal axis shows the toner application amount, and a vertical axis shows the number of the driving revolutions of the outer secondary transfer roller 206 (the further upward in the figure, the greater). Further, FIG. 7 shows the relationship which is described above by target image magnification. A positive target image magnification indicates that the image is stretched, while a negative target image magnification indicates that the image is contracted. As shown in FIG. 7, it is found that a range of variation in the number of the driving revolutions of the outer secondary transfer roller 206 which is required to correspond to variation of the toner application amount depending on the target image magnification is different.

Here, there are concerns in terms of control performance of driving, vibration, etc., when the number of the driving revolutions of the outer secondary transfer roller 206 is varied significantly, corresponding to varying constantly of the toner application amount of the toner image which is secondary transferred, while one sheet of the recording medium P is passing through the secondary transfer portion N2. Therefore, the target image magnification is desirable to be set so that a range of variation in the number of the driving revolutions of the outer secondary transfer roller 206 with respect to the toner application amount variation is small. However, in a case that the target image magnification is set in this way, image size does not always match size of an original document image. Therefore, regarding a magnification error with respect to the original document image which occurs when the predetermined target image magnification is set, it is desirable to change the magnification of the original document image data (magnification conversion) in advance to cancel the magnification error.

The relationship between the number of the driving revolutions of the outer secondary transfer roller 206 and the toner application amount which is shown in FIG. 7 is stored in the storing portion 501. The calculating portion 504 determines the number of the driving revolutions of the outer roller 206 corresponding to the divided video count value $Vc_{ij}$ (average toner application amount) for each divided region which is sent from the video counting portion 513, for each divided region, based on the relationship, which is described above, which is read from the storing portion 501. That is, in the embodiment, in a case that the toner application amount in a predetermined region of the recording medium P is a first predetermined amount, the control portion 309 sets the driving speed of the outer secondary transfer roller 206 when the predetermined region of the recording medium P passes through the secondary transfer portion N2 as a first speed. Further, in a case that the toner application amount in the predetermined region of the recording medium P is a second predetermined amount which is greater than the first predetermined amount, the control portion 309 sets the driving speed of the outer secondary transfer roller 206 when the predetermined region of the recording medium P passes through the secondary transfer portion N2 as a second speed which is lower than the first speed. Further, in a case that the toner application amount in the predetermined region of the recording medium P is a third predetermined amount which is greater than the second predetermined amount, the control portion 309 sets the driving speed of the outer secondary transfer roller 206 when the predetermined region of the recording medium P passes through the secondary transfer portion N2 as a third speed which is lower than the second speed.

Incidentally, the relationship between the number of the driving revolutions of the outer secondary transfer roller 206 and the toner application amount which is shown in FIG. 7 may be stored in the storing portion 501 while it is set for each type of the recording medium P. And based on information on the recording medium P to which the toner image is transferred, the calculating portion 504 may determine the number of the driving revolutions of the outer secondary transfer roller 206 by selecting and using the corresponding relationship which is described above. Here, the information on the recording medium P includes arbitrary information which is possible to distinguish the recording medium P, including attributes based on general characteristics such as plain paper, fine paper, glazed paper, glossy paper, coated paper, embossed paper, thick paper, thin paper, synthetic paper and label paper (what is called, paper type categories); numerical values or numerical value ranges of physical properties such as basis weight, thickness, surface gloss, whiteness and stiffness; brand name (including manufacturer, product name, part number, etc.). It is possible to view each of the recording medium P which is distinguished by information of the recording medium P as configuring a type of the recording medium P. Further, the information of the recording medium P may be included in print mode information which specifies an operational setting of the image forming apparatus 100, such as “plain paper mode”, “thick paper mode”, and “thin paper mode”, for example, or may be substituted by print mode information.

8. Operation Around Secondary Transfer Portion for Each Page

An operation around the secondary transfer portion N2 in order to suppress the image magnification variation while transferring different toner image patterns to the recording medium P on each page will be described. As described above, the secondary transfer portion (the secondary transfer nip portion) N2 in which the intermediary transfer belt 204 contacts the outer secondary transfer roller 206 is formed by the inner secondary transfer roller 205 and the outer secondary transfer roller 206 which are arranged so as to nip the intermediary transfer belt 204 and are opposing each other.

In the embodiment, the outer secondary transfer roller 206 is configured so that it is possible to switch between an abutting (contacting) state in which it abuts against the intermediary transfer belt 204 and a spacing (separating) state in which it is spaced away from the intermediary transfer belt 204. The image forming apparatus 100 is provided with an abutting/spacing mechanism (not shown) for switching the abutting state and the spacing state of the outer secondary transfer roller 206 with respect to the intermediary transfer belt 204. The abutting/spacing mechanism is controlled by the control portion 309 and switches between the abutting state and the spacing state of the outer secondary transfer roller 206 with respect to the intermediary transfer belt 204. In the embodiment, the outer secondary transfer roller 206 begins to rotate in the spacing state before a first sheet of the recording medium P in a job (a series of operations to form images on a single or a plurality of the recording mediums P which are initiated by a start instruction) is fed from the registration portion 208 to the secondary transfer portion N2. Further, after that, the outer secondary transfer roller 206 abuts against the intermediary transfer belt 204 before the recording medium P reaches the secondary transfer portion N2. At this time, the number of the driving revolutions of the outer secondary transfer roller 206 is the number of the driving revolutions $N_{ITB}$, in which the surface speed of the outer secondary transfer roller 206 is substantially same as the surface speed of the intermediary transfer belt 204.

After the recording medium P which is fed from the cassette 214 waits in the registration portion 208, the recording medium P is fed from the registration portion 208 when timing is controlled by the control portion (CPU) 309 so as to align the toner image with the recording medium P. After that, the outer secondary transfer roller driving motor M2 is controlled by the driving control portion 503 of the control portion 309, so that the number of the driving revolutions of the outer secondary transfer roller 206 is varied according to toner image distribution by synchronizing with timing when the recording medium P enters the secondary transfer portion N2. The number of the driving rotations of the outer secondary transfer roller 206, when the toner image at a position of a distance y from a leading end of the recording medium P with respect to the feeding direction, is controlled as the number of the driving rotations at a time t when the recording medium P is fed by a distance y from the leading end of the recording medium P with respect to the feeding direction in the secondary transfer portion N2.

9. In Case of Controlling According to Toner Application Amount Distribution in Subscanning Direction which is Averaged in Main Scanning Direction Determination of the number of the driving rotations of the outer secondary transfer roller 206 in order to suppress the image magnification variation due to the toner application amount distribution will be described by using an image which is shown in FIG. 8 (*a*), as an example.

Figure 8:
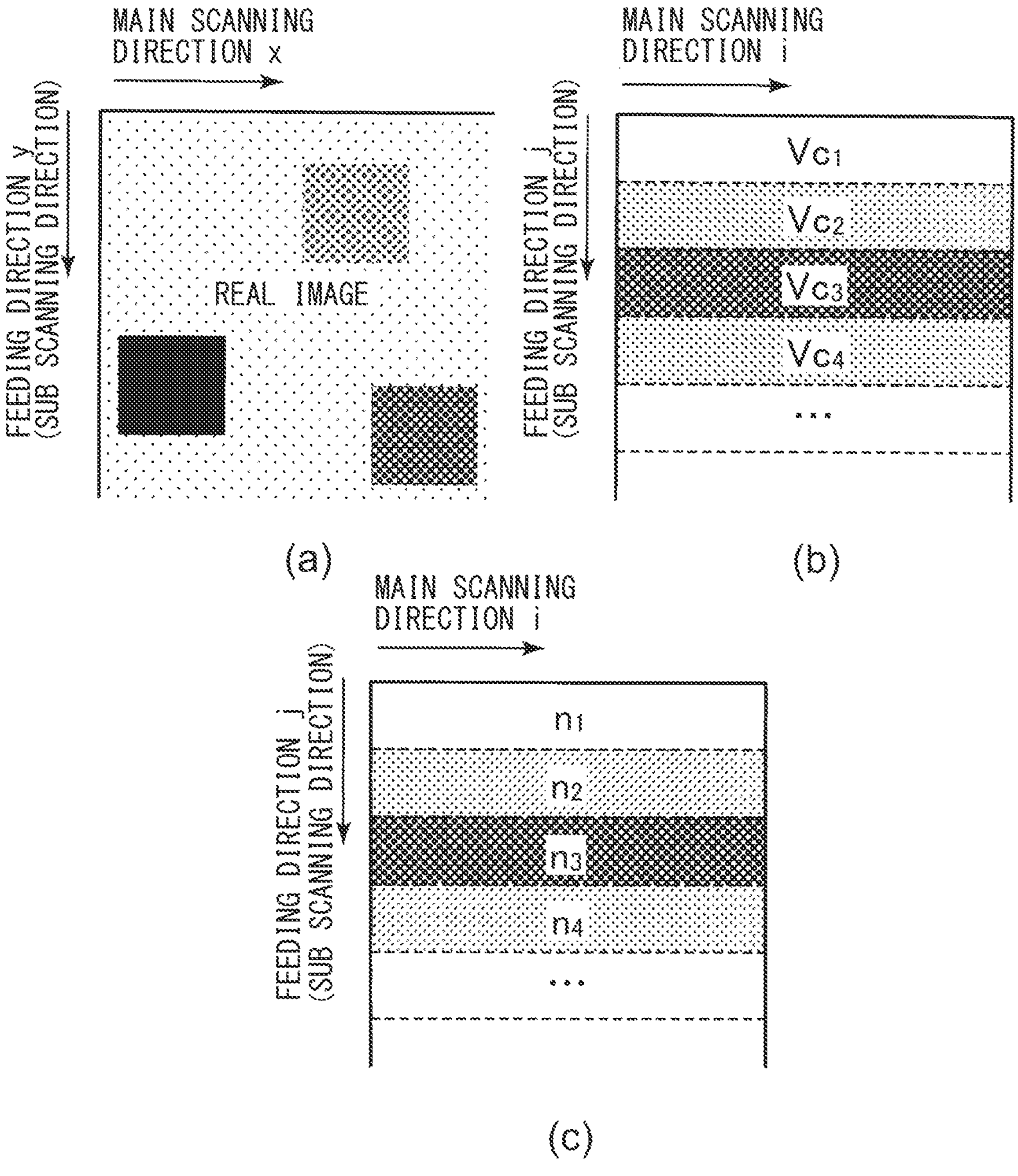
FIG. 8, part (a), part (b) and part (c), is a schematic diagram for illustrating a calculating method of the number of the driving revolutions of the outer secondary transfer roller according to a first embodiment.

The image which is shown in FIG. 8 (*a*), is converted into the toner application amount per pixel by the color conversion processing portion 512 and a divided video count value $Vc_j$ for each predetermined region (divided region) is calculated by the video counting portion 513. In the embodiment, as shown in FIG. 8 (*b*), the divided region for calculating the divided video count value is defined as the image data of each page is divided only in the subscanning direction among the main scanning direction and the subscanning direction. And the average toner application amount for each divided region is used as the divided video count value $Vc_j$. Therefore, in each divided region in the subscanning direction, the toner application amount is averaged in the main scanning direction. Incidentally, the average toner application amount for each divided region which is divided in the main scanning direction and subscanning direction may be calculated as described above, and the average toner application amount for each divided region which is averaged in the main scanning direction may be the average toner application amount for each divided region in each subscanning direction.

The calculating portion 504 applies the divided video count value $Vc_j$ which is calculated for each divided region in the subscanning direction to information (relational equation, table, etc.) which indicates the relationship between the toner application amount and the number of the driving revolutions of the outer secondary transfer roller 206 which are shown in FIG. 7. In this way, the calculating portion 504 calculates the command value (nj) of the number of the driving revolutions of the outer secondary transfer roller 206 in order to correct the image magnification to a predetermined value (FIG. 8 (*c*)).

Therefore, by varying the number of the driving revolutions of the outer secondary transfer roller 206 based on the toner application amount distribution of the image which is transferred on one sheet of the recording medium P, it is possible to suppress the image magnification variation.

Incidentally, in FIG. 8 (*c*), since the command value of the number of the driving revolutions of the outer secondary transfer roller 206 which is based on the toner application amount distribution corresponds to each divided region in the subscanning direction, the number of the driving revolutions of the outer secondary transfer roller 206 may be discontinuous in the subscanning direction. Therefore, in order to avoid rapid acceleration and deceleration of the number of the driving revolutions of the outer secondary transfer roller 206, the command value of the number of the driving revolutions of the outer secondary transfer roller 206 may be averaged in the subscanning direction by calculating moving average in the subscanning direction (the feeding direction), etc.

Further, since the number of the driving revolutions of the outer secondary transfer roller 206 is calculated corresponding each divided region in the subscanning direction, the narrower a width of each divided region in the subscanning direction, the better tracking performance to variation of the toner application amount distribution. However, in the secondary transfer portion N2, the toner image is sequentially transferred to the recording medium P in the feeding direction (the subscanning direction) within a range which is nipped between the intermediary transfer belt 204 and the secondary transfer outer roller 206. At this time, variation of the toner application amount in a width, which is smaller than length in which the recording medium P contacts the intermediary transfer belt 204, is unlikely to appear as a partial magnification error in the image. Further, it is not desirable since the calculating process is increased, when the divided region in which the number of the driving revolutions of the outer secondary transfer roller 206 calculated from the divided video count value is divided excessively small. From this, the effect is diminishing, even when the width of the divided region in the subscanning direction is smaller than a contacting length between the intermediary transfer belt 204 and the recording medium P in the secondary transfer portion N2. That is, it is desirable that the width of the divided region in the subscanning direction is greater than the contacting length between the intermediary transfer belt 204 and the recording medium P in the secondary transfer portion N2. In other words, it is desirable that the width of the divided region in the subscanning direction is larger than a secondary transfer nip width in which the intermediary transfer belt 204 and the secondary transfer outer roller 206 are contacted with each other in the feeding direction.

Figure 11:
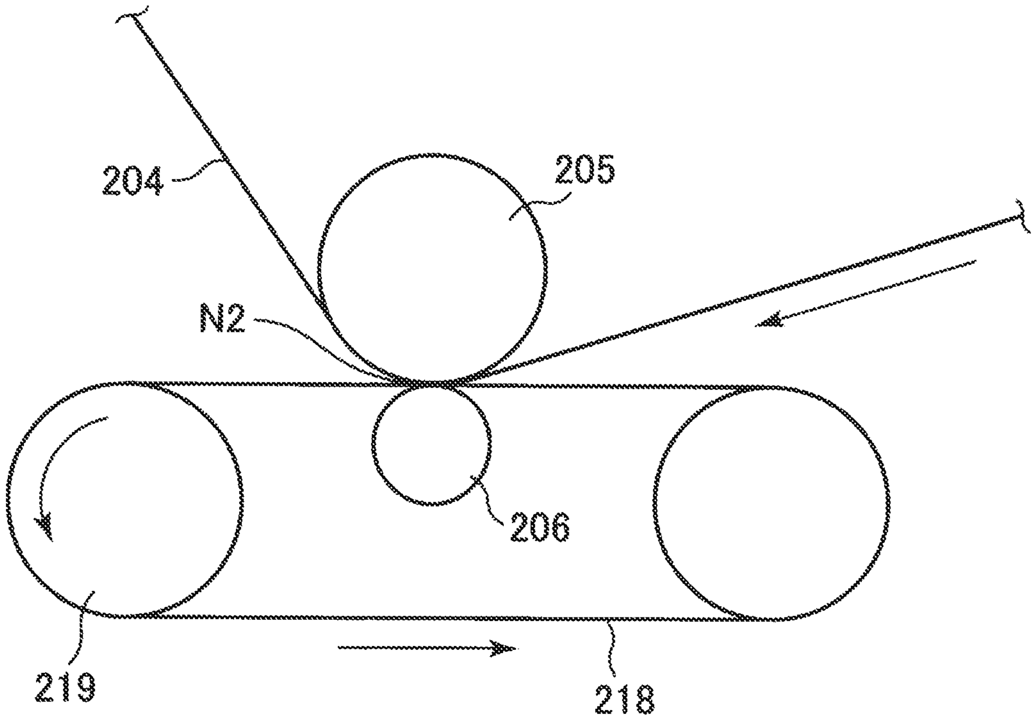
FIG. 11 is a schematic diagram for illustrating another example of a transfer member.

Incidentally, in the embodiment, a configuration, in which the variation of the image magnification is suppressed by varying the number of the driving revolutions of the outer secondary transfer roller 206 and stabilizing the feeding speed of the recording medium P, is described. However, the present invention is not limited to this configuration, and it may be a configuration which is shown in FIG. 11, for example. That is, the outer secondary transfer outer roller 206 presses the intermediary transfer belt 204 via an outer secondary transfer belt (an outer transfer member, a transfer member) 218. And the recording medium P is nipped between the intermediary transfer belt 204 and the outer secondary transfer belt 218, and the toner image is secondary transferred to the recording medium P. The outer secondary transfer belt 218 is stretched over a plurality of stretching rollers including outer secondary transfer belt driving roller 219, and the outer secondary transfer roller 206 which is described above is arranged on its inner peripheral side. In this case, it is possible to suppress the variation of the image magnification by controlling the number of the driving revolutions of the outer secondary transfer belt driving roller 219 which rotatably drives the outer secondary transfer belt 218 according to the toner application amount distribution and stabilizing the feeding speed of the recording medium P.

Thus, in the embodiment, the image forming apparatus 100 includes a rotatable image bearing member 204, a rotatable transfer member 206 which abuts against the image bearing member 204, forms the transfer portion N2, and transfers the toner image to the recording medium P which passes through the transfer portion N2 from the image bearing member 204, a first driving source M1 which drives the image bearing member 204, a second driving source M2 to drive the transfer member 206, an acquiring portion (a video count portion) 513 which acquires information about toner image distribution on an in-plane of the recording medium P which is transferred to the recording medium P in the transfer portion N2 and the control portion 309 (more in detail, the driving control portion 503, the calculating portion 504), and the control portion 309 is possible to vary the number of driving revolutions of the transfer member 206 by the second driving source M2 while the recording medium P passes through the transfer portion N2 based on the distribution information which is described above. In the embodiment, the acquiring portion 513 acquires an index value correlating with a toner amount of the toner image transferred to each of the plurality of the divided regions of an in-plane of the recording material P in the feeding direction, and the control portion 309 sets the number of the driving revolutions of the transfer member 206 by the second driving source M2 while each of the divided regions which are described above passes through the transfer portion N2 based on the index values which are described above of each of the divided regions which are described above. Further, in the embodiment, relationship between the index values which are described above of each of the divided regions which are described above is nonlinear. Further, in the embodiment, the index values which are described above of each of the divided regions indicate average values in which the index values which are correlated with the toner amount of the toner image which are transferred to each of the divided regions which are described above are averaged in a direction which is perpendicular to the feeding direction which is described above. Here, the index value which correlates with the toner amount is typically an area ratio of the toner image per unit area. Further, it is desirable that width of each of the divided regions which is described above in the feeding direction which is described above is greater than length of contact region between the image bearing member 204 and the recording medium P with respect to the feeding direction which is described above. Further, the transfer member 206 may be configured of a roller or an endless belt.

As described above, in the embodiment, while the toner image is being transferred to the recording medium P in the secondary transfer portion N2, the number of the driving revolutions of the outer secondary transfer roller 206 is varied within in-plane area according to the toner image distribution of the image which is formed on the recording medium P. Therefore, it is possible to suppress the image magnification variation due to the toner image distribution. According to the embodiment, even when the toner application amount is not proportional to the image expansion and contraction, the number of the driving revolutions of the outer secondary transfer roller 206 is appropriately controlled and it is possible to suppress the image magnification variation. Thus, according to the embodiment, even in a case that the toner image distribution is variously different, the image magnification variation on the recording medium P is effectively suppressed, and it is possible to suppress the image expansion and contraction, a misalignment, etc., on the recording medium P.

Second Embodiment

Next, another embodiment of the present invention will be described. A basic configuration and an operation of the image forming apparatus according to the embodiment is same as the first embodiment. Thus, in the image forming apparatus according to the embodiment, elements which include same or corresponding functions or configurations as those of the image forming apparatus in the first embodiment are marked with same reference numerals as in the first embodiment, and detailed descriptions are omitted.

In the first embodiment, the toner application amount distribution in the main scanning direction is applied by being averaged, however, even when the average value is same, there may be a difference in an appropriate number of the driving rotations of the outer secondary transfer roller 206 between a case that the toner application amount in the main scanning direction is relatively uniform or a case that it is biased. Therefore, in the embodiment, the number of the driving revolutions of the outer secondary transfer roller 206 is determined by considering the toner application amount distribution in the main scanning direction. Incidentally, descriptions will be omitted appropriately, since operations other than calculation to determine the number of the driving revolutions of the outer secondary transfer roller 206 are same as in the first embodiment.

1. Control Considering Toner Application Amount Distribution in Main Scanning Direction Using the image which is shown in FIG. 9 (*a*), as an example, determination of the number of the driving rotations of the outer secondary transfer roller 206 to suppress the image magnification variation due to the toner application distribution in the embodiment will be described.

Figure 9:
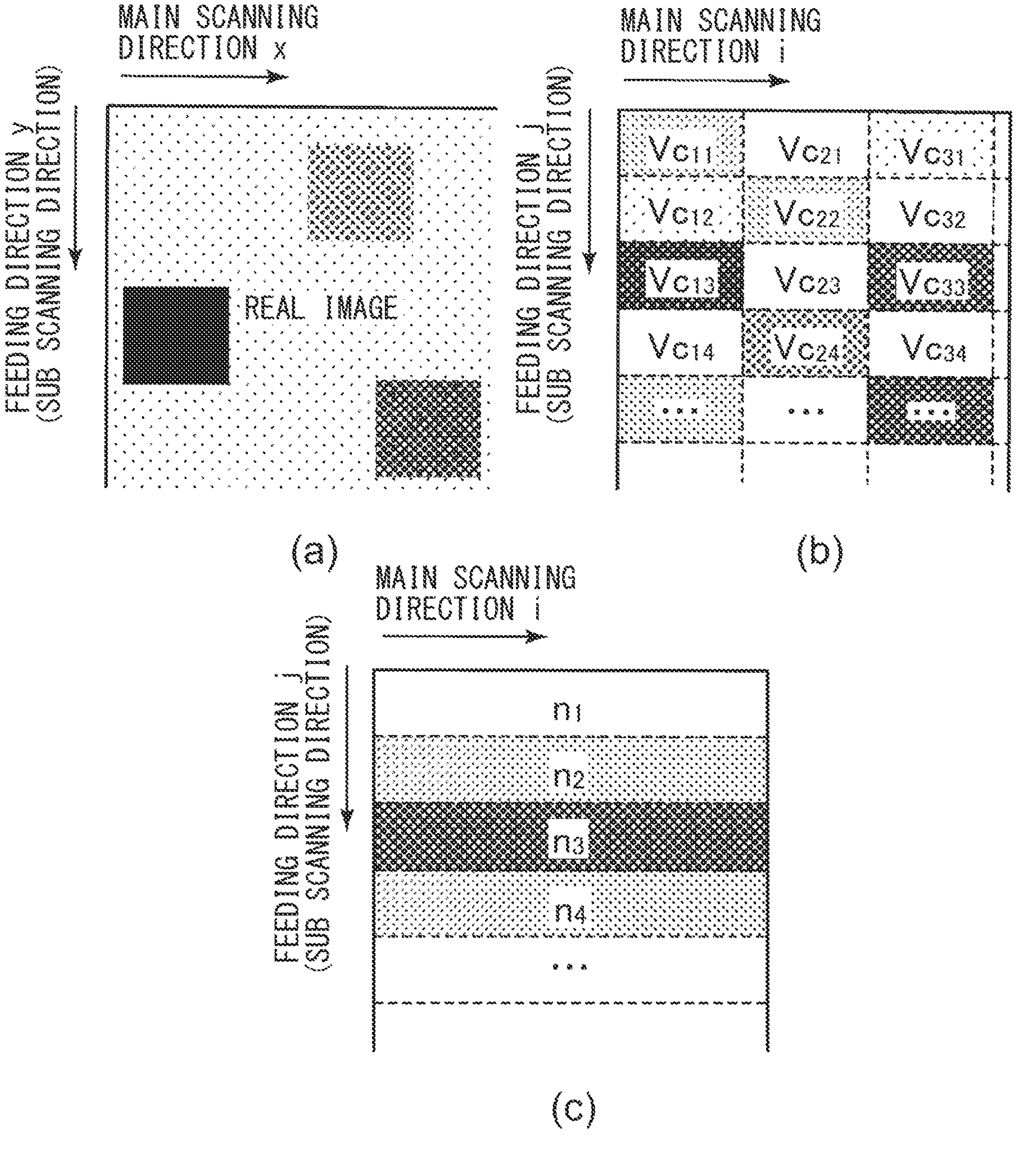
FIG. 9, part (a), part (b) and part (c), is a schematic diagram for illustrating a calculating method of the number of the driving revolutions of the outer secondary transfer roller according to a second embodiment.

In the embodiment, the divided video count value $Vc_{ij}$ is calculated for each of the divided regions which are divided by each predetermined size in the main scanning direction and in the subscanning direction as described FIG. 9 (*a*) by the video count portion 513.

Next, a row of the divided regions which are aligned in the main scanning direction corresponding to one divided region (for example, number j) in the subscanning direction will be described. The toner application amount distribution in the main scanning direction, that is, the divided video count value $Vc_{ij}$ (i=from 1 through m), may be biased. And it is possible to assume a uniform toner application amount (the divided video count value $Vc_j$) in the main scanning direction, in which the image magnification is equivalent to the image magnification which occurs in the case. Specifically, weight (a weight coefficient) w, according to a dimension of the divided video count values $Vc_{ij}$ (i=from 1 through m) which are aligned in the main scanning direction, is set, and is regarded as follows.

$$Vc_j = \sum_{i=1}^{m} w(Vc_i) \cdot Vc_{ij}$$

Here, in a case of the relationship between the toner application amount and the image magnification variation is as shown in FIG. 2 (*a*), for example, the weight w is also set to increase around 20% of the toner application amount along the curve. That is, the weight w is set so that the toner application amount in which the image magnification variation is relatively large is larger than the toner application amount in which the image magnification variation is relatively small.

Based on this approach, it is possible to determine the number of the driving revolutions of the outer secondary transfer roller 206 as follows. That is, the relationship between the number of the driving revolutions of the outer secondary transfer roller 206 and the image magnification for the divided region in the subscanning direction in which the toner application amount distribution in the main scanning direction is biased is calculated with a weighted average by the weight w according to magnitude of the divided video count value $Vc_{ij}$ (i=from 1 through m) in a relational expression (a linear expression) between the number of the driving revolutions and the image magnification which differ by each toner application amount as shown in FIG. 3 (*a*). From the linear expression which is obtained in this way, the number of the driving revolutions of the outer secondary transfer roller 206 is uniquely calculated in order to correct the image magnification to a predetermined value. That is, it is possible to calculate the command value of the number of the driving revolutions of the outer secondary transfer roller 206 in order to correct the image magnification to the predetermined value by using the relational expression which corresponds to the weighted average which is obtained as described above, among the relational expressions between the number of the driving revolutions and the image magnification of each weighted average of the toner application amount in the main scanning direction by the toner application amount which is described above. Incidentally, it is possible to store the information of the relational expression (the linear expression) which is described in the storing portion 501. Further, the information of this relational expression (the linear expression) may be set for each type of the recording medium P and stored in the storing section 501.

When the process which is described above is performed sequentially for each divided region which is divided in the subscanning direction, it is possible to determine the command value of the number of the driving revolutions of the outer secondary transfer roller 206 which corresponds to each divided region in the subscanning direction, which corrects the image magnification in the feeding direction as shown in FIG. 9 (*c*).

In this way, in the embodiment, an image pattern is made one-dimensional based on the relationship between image density variation and the image magnification variation in the main scanning direction (that is, the image magnification variation is converted to the equivalent image density variation in the subscanning direction). And the speed of the outer secondary transfer roller 206 is controlled so as to cancel the image magnification variation due to the image density variation in the subscanning direction. That is, in the embodiment, the image region is divided in the main scanning direction, and the weight to the image magnification in the subscanning direction is estimated by the image density of each divided image region. And it is converted to a uniform image pattern in the main scanning direction, in which sensitivity to the image magnification is equivalent. For the toner application amount of this image pattern, the speed of the outer secondary transfer roller 206 is calculated in order to obtain the predetermined image magnification, based on the relationship between the speed of the outer secondary transfer roller 206 and the image magnification for each toner application amount which is calculated in advance. This process is performed for each image region which is divided in the subscanning direction. In this way, for any image pattern, the speed of the outer secondary transfer roller 206 is variably controlled in-plane (from entry of the leading end of the recording medium P into the secondary transfer portion N2 to exit of the trailing end of the recording medium P) to stabilize the partial magnification in the feeding direction by considering the toner image distribution in the plane. As a result, for any image pattern, it is possible to reduce in-plane image magnification variation in the feeding direction.

Incidentally, in FIG. 9 (*c*), since the command value of the number of the driving revolutions of the outer secondary transfer roller 206 based on the toner application amount distribution corresponds to each divided region in the subscanning direction, the number of the driving revolutions of the outer secondary transfer roller 206 may be discontinuous in the subscanning direction. Therefore, in order to avoid rapid acceleration and deceleration of the number of the driving revolutions of the outer secondary transfer roller 206, the command value of the number of the driving revolutions of the outer secondary transfer roller 206 may be averaged in the subscanning direction by calculating moving average in the subscanning direction (the feeding direction), etc.

2. In Case that Toner Image Position in Main Scanning Direction is Considered Further, in a case that the toner application amount distribution is biased within the divided region in the main scanning direction as described above, the image magnification may further vary depending on a position of the toner image in the main scanning direction. For example, there are a case that the toner image may be positioned near a center of the recording medium P in the main scanning direction and a case that the toner image may be positioned near end portion of the recording medium P in the main scanning direction. In such cases, it is possible to determine the number of the driving revolutions of the outer secondary transfer roller 206 by considering the position of the toner image in the main scanning direction.

Figure 10:
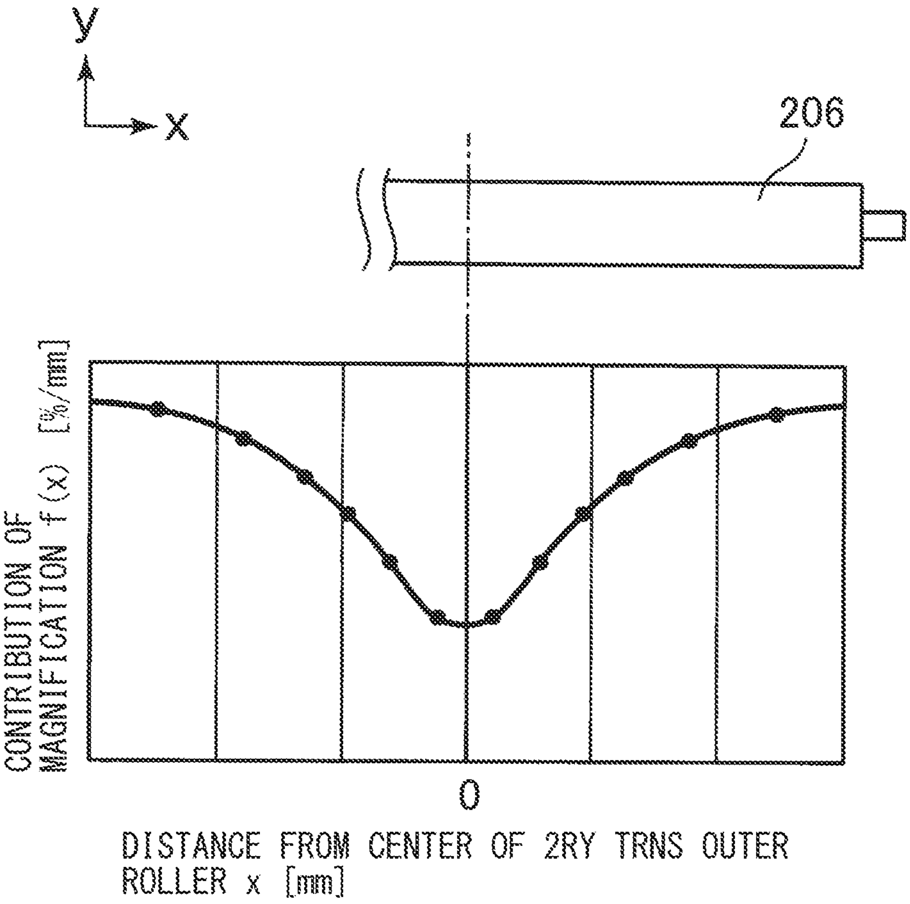
FIG. 10 is an illustration showing an example of contribution to the magnification of the image with respect to a position of a toner image in a main scanning direction.

FIG. 10 shows an example of the variation rate of the image magnification with respect to the position of the toner image in the main scanning direction. In a case of the example which is shown in FIG. 10, the farther away from the center in the main scanning direction, the greater the effect on image magnification for the same toner image. Here, contribution to the image magnification at position x from the center of the outer secondary transfer roller 206 in a longitudinal direction (substantially parallel to the main scanning direction) may be described as $f_i$ (i=from 1 through m) which is divided into a plurality of divided regions in the longitudinal direction which corresponds to the divided video count value similar to the divided video count value $Vc_{ij}$.

Further, similar to the case of weighting by the toner application amount which is described above, it is possible to estimate a uniform toner application amount (a divided video count value $Vc_j$) in the main scanning direction in which an image magnification which is caused according to the toner application amount and the position of the toner image is equivalent to the image magnification. Therefore, it is possible to calculate the weighted average by the toner application amount and the position of the toner image, similar to the case of weighting by the toner application amount which is described above.

And it is possible to calculate the number of the driving revolutions of the outer secondary transfer roller 206 as follows. That is, the relationship between the number of the driving revolutions of the outer secondary transfer roller 206 and the image magnification for the divided region in the subscanning direction is calculated with the weighted average by the weight w according to magnitude of the divided video count value $Vc_{ij}$ (i=from 1 through m) in a relational expression (a linear expression) between the number of the driving revolutions and the image magnification which differ by each toner application amount as shown in FIG. 3 (*a*) and a weight $f_i$ according to the position x from the center of the outer secondary transfer roller 206 in the longitudinal direction. From the linear expression which is obtained in this way, the number of the driving revolutions of the outer secondary transfer roller 206 is uniquely calculated in order to correct the image magnification to a predetermined value. That is, it is possible to calculate the command value of the number of the driving revolutions of the outer secondary transfer roller 206 in order to correct the image magnification to the predetermined value by using the relational expression which corresponds to the weighted average which is obtained as described above, among the relational expressions between the number of the driving revolutions and the image magnification of each weighted average of the toner application amount in the main scanning direction by the toner application amount and the position of the toner image which are described above. Incidentally, it is possible to store the information of the relational expression (the linear expression) which is described in the storing portion 501. Further, the information of this relational expression (the linear expression) may be set for each type of the recording medium P and stored in the storing section 501.

When the process which is described above is performed sequentially for each divided region which is divided in the subscanning direction, it is possible to determine the command value of the number of the driving revolutions of the outer secondary transfer roller 206 which corresponds to each divided region in the subscanning direction, which corrects the image magnification in the feeding direction which is similar to FIG. 9 (*c*).

In this way, an image pattern is made one-dimensional based on the relationship between image density variation and the image magnification variation (that is, the image magnification variation is converted to the equivalent image density variation in the subscanning direction), even by considering the position of the image in the main scanning direction. And it is possible to control the speed of the outer secondary transfer roller 206 so as to cancel the image magnification variation due to the image density variation in the subscanning direction. That is, the image region is divided in the main scanning direction, and the weight to the image magnification in the subscanning direction is estimated by the image density of each divided image region and the position in the main scanning direction. And it is possible to convert to a uniform image pattern in the main scanning direction, in which sensitivity to the image magnification is equivalent. In this way, for any image pattern, the speed of the outer secondary transfer roller 206 is variably controlled in-plane to stabilize the partial magnification in the feeding direction by a method which is more practical to the toner image distribution in the plane. As a result, for any image pattern, it is possible to further reduce in-plane image magnification variation in the feeding direction.

Incidentally, even in this case, when the number of the driving revolutions of the outer secondary transfer roller 206 is calculated based on the toner application amount distribution for each divided region which is divided in the subscanning direction, the number of the driving revolutions of the outer secondary transfer roller 206 may be discontinuous in the subscanning direction. Therefore, in order to avoid rapid acceleration and deceleration of the number of the driving revolutions of the outer secondary transfer roller 206, the command value of the number of the driving revolutions of the outer secondary transfer roller 206 may be averaged in the subscanning direction by calculating moving average in the subscanning direction (the feeding direction), etc.

Further, the example of the characteristic in which the contribution of the image magnification to the position of the toner image in the main scanning direction increases as the image is away from the center of the outer secondary transfer roller 206 is shown in FIG. 10, however, it is not limited to this. The contribution of the image magnification to the position of the toner image in the main scanning direction depends on a device configuration, such as shape and material of the outer secondary transfer roller and distribution of nipping force of the recording medium P in the secondary transfer portion N2, for example. Therefore, the driving speed of the outer secondary transfer roller 206 may be determined by considering the contribution of the image magnification which is unique to each device configuration.

In this way, even in the embodiment, similar to the first embodiment, the acquiring portion 513 acquires the index value correlating with the toner amount of the toner image transferred to each of the plurality of the divided regions of an in-plane of the recording material P in the feeding direction, and the control portion 309 sets the number of the driving revolutions of the transfer member 206 by the second driving source M2 while each of the divided regions which are described above passes through the transfer portion N2 based on the index values which are described above of each of the divided regions which are described above. And, in the embodiment, the index value which is described above for each of the divided regions which is described above is a weighted average value which is obtained by weighting and averaging the index value of the toner amount of the toner image which is transferred to each of the plurality of the regions in a direction which is perpendicular to the feeding direction of the recording medium P in each of the divided regions which is described above based on the index value of each of the plurality of the regions. Or, in the embodiment, the index value which is described above for each of the divided regions which is described above is a weighted average value which is obtained by weighting and averaging the index value of the toner amount of the toner image which is transferred to each of the plurality of the regions in a direction which is perpendicular to the feeding direction in each of the divided regions which is described above based on the index value of each of the plurality of the regions and information of the positions of the plurality of the regions in the directions which are perpendicular to each of the feeding directions which are described above. In this case, the information of the positions which are described above may be information which indicates the distance from the center of the recording medium P with respect to the direction which is perpendicular to the feeding direction.

[Others]

The present invention is described according to the specific embodiments, however, the present invention is not limited to the embodiments which are described above.

In the embodiments which are described above, an example of applying the present invention to a tandem type color image forming apparatus which is provided with a plurality of the photosensitive members, is used; however, the present invention is not limited to such a mode. The present invention may be applied to, for example, what is called a one drum type color image forming apparatus, in which a toner image of a plurality of colors is formed on a single photosensitive member and is transferred to a recording medium via an intermediary transfer member or to a single color image forming apparatus, etc.

According to the present invention, it is possible to effectively suppress variation in the magnification of the image on the recording media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198925 filed on Dec. 7, 2021, which is hereby incorporated by reference herein in its entirety.

What is claimed is:

1. An image forming apparatus comprising:

a rotatable image bearing member configured to bear a toner image;

a rotatable transfer member configured to form a transfer portion by contacting the image bearing member and to transfer the toner image to a recording material passing through the transfer portion from the image bearing member;

a first driving source configured to drive the image bearing member;

a second driving source configured to drive the transfer member; and a control portion configured to control the second driving source, wherein, based on a toner amount per unit area of the toner image transferred to each of a plurality of first divided regions into which a plane of the recording material is divided with respect to a feeding direction of the recording material, the control portion controls a driving speed of the transfer member while each of the plurality of the first divided regions passes through the transfer portion, and wherein the control portion acquires an index value correlating with a toner amount of the toner image transferred to each of a plurality of second divided regions into which each of the first divided regions is divided with respect to a widthwise direction crossing the feeding direction of the recording material, and the control portion controls the driving speed of the transfer member based on the index value while the corresponding first divided region passes through the transfer portion.

2. An image forming apparatus according to claim 1, wherein the control portion changes the driving speed of the transfer member based on the index value and information on each of positions of the plurality of the second divided regions while the first divided region passes through the transfer portion.

3. An image forming apparatus according to claim 2, wherein the information on the positions is a distance from a center of the recording material with respect to the widthwise direction.

4. An image forming apparatus according to claim 1, wherein the index value correlating with the toner amount is an area ratio of the toner image per unit area.

5. An image forming apparatus according to claim 1, wherein a width of each of the plurality of the first divided regions with respect to the feeding direction is longer than a length of the transfer portion with respect to the feeding direction.

6. An image forming apparatus according to claim 1, wherein the transfer member is constituted by a roller or an endless belt.

* * * * *